(No Model.)

Z. HENDRICKSON.
VELOCIPEDE.

No. 280,473. Patented July 3, 1883.

WITNESSES:
Theo. G. Hoster
C. Sedgwick

INVENTOR:
Z. Hendrickson
BY Munn & Co
ATTORNEYS.

UNITED STATES PATENT OFFICE.

ZACHARIAH HENDRICKSON, OF SYRACUSE, INDIANA.

VELOCIPEDE.

SPECIFICATION forming part of Letters Patent No. 280,473, dated July 3, 1883.

Application filed May 2, 1883. (No model.)

*To all whom it may concern:*

Be it known that I, ZACHARIAH HENDRICKSON, of Syracuse, in the county of Kosciusko and State of Indiana, have invented a new and Improved Road-Carriage, of which the following is a full, clear, and exact description.

The object of my invention is to provide a new and improved vehicle which can be propelled by hand, and can be steered and guided very easily.

The invention consists in a vehicle constructed with a front driving-wheel which can be operated by hand, and with a pivoted rear axle connected with a steering device adapted to be operated by the feet, and to adjust the rear axle according to the direction in which the vehicle is to turn, which steering device is provided with a bolt for locking the rear axle in position when the vehicle is to be run straight ahead.

Reference is to be had to the accompanying drawings, forming part of this specification, in which similar letters of reference indicate corresponding parts in all the figures.

Figure 1:
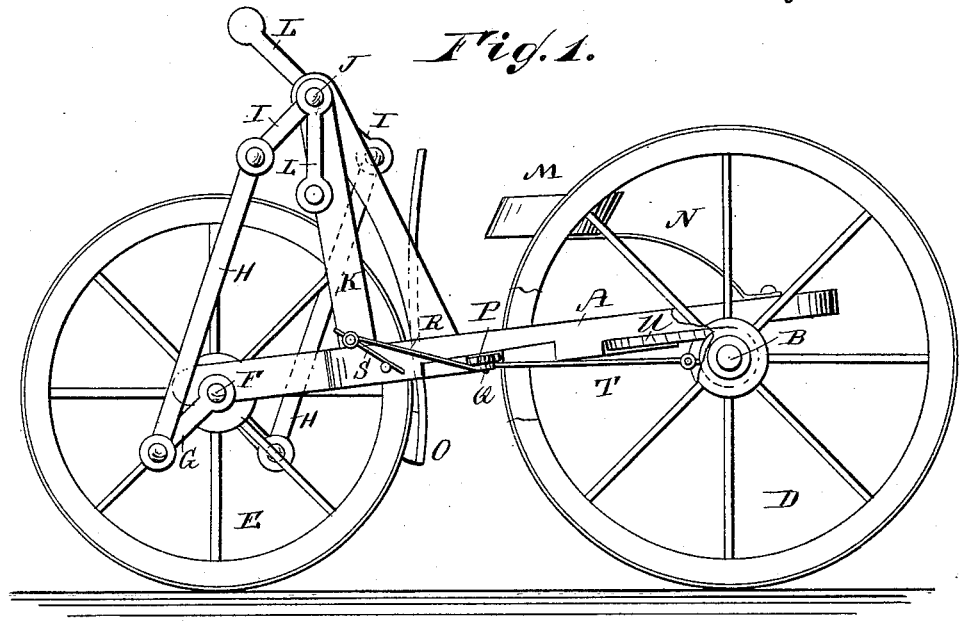
Figure 2:
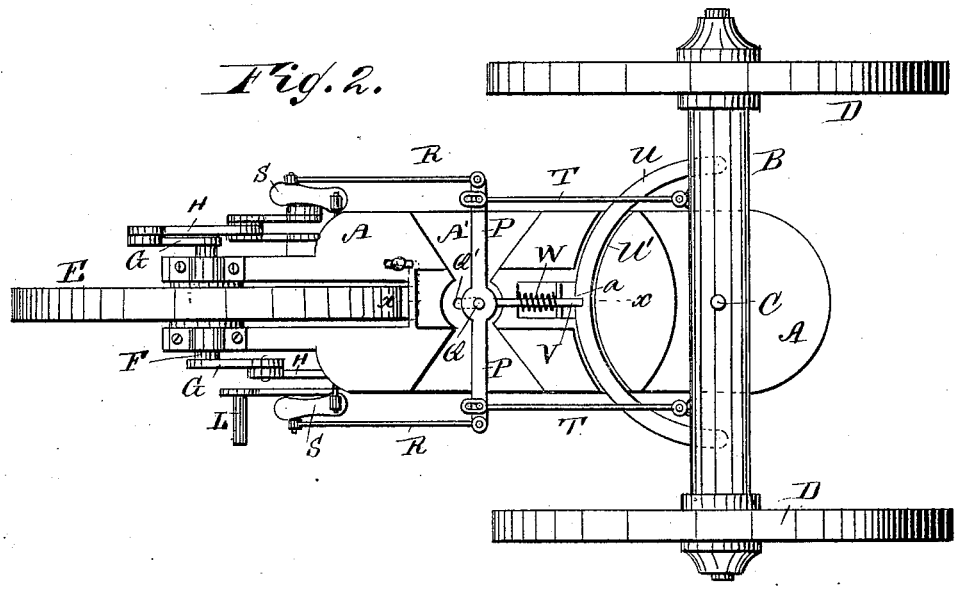
Figure 3:
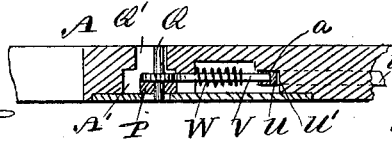

Figure 1 is a longitudinal elevation of my improved vehicle. Fig. 2 is a plan view of the under side of the same. Fig. 3 is an enlarged detail sectional elevation of part of the same on the line *x x*, Fig. 2.

The vehicle frame or platform A rests at its rear end on the rear axle, B, on which it is pivoted by the king-bolt C. Wheels I are loosely mounted on the ends of the axle B. In the front narrowed or tapered end of the frame A the driving-wheel E is journaled, the shaft F of which is provided on each end with a crank, G, the free ends of which are pivoted to connecting-rods H, pivoted to cranks I on a shaft, J, journaled in a standard, K, on the front part of the frame A. The shaft J is provided with crank-handles L, having suitable loose handle-knobs.

The rider sits on a seat, M, supported by a spring, N. A brake, O, is pivoted on the frame in front of the seat. A transverse lever, P, is pivoted centrally on the under side of the platform by a pintle, Q, passing through a longitudinal slot, Q', in the platform or frame A. To the ends of the bar P rods R are pivoted, which have their opposite ends pivoted to the upper free ends of foot-levers or foot-rests S, pivoted to the sides of the frame. Rods T are connected to the bar P, near its ends, by pins of the bar entering elongated holes or loops of the rods, to allow a limited forward movement of the bar, and said rods T have their opposite ends pivoted to the rear axle, B, to which a semicircular guide-frame, U, is fastened, which passes through a suitable groove, U', in the side of the frame or platform A. The said frame is provided in the middle of its outer edge with a notch, *a*, in which a bolt, V, passes, which is attached to the middle of the lever P and projects backward. A spiral spring, W, surrounding the bolt V and fastened thereto, presses its end against the outer curved edge of the frame U. The frame or platform A is provided in its under side with a recess, A', in which the lever P can swing.

The operation is as follows: The vehicle is propelled by turning the crank L. Ordinarily it can be steered by throwing the weight of the body more to one side or the other. If a corner is to be turned, both foot-rests S are pressed forward by means of the feet, whereby the bolt V will be withdrawn from the notch *a*, and then the rear axle, B, can be inclined more or less to the longitudinal axis of the vehicle by exerting a greater or less pressure on one or the other of the foot-rests S. As soon as the vehicle runs straight ahead, the bolt V snaps into the notch *a* and locks the axle in place.

Baskets, packages, &c., can be placed on the rear part of the frame or platform A.

The rods T may be provided at either the front or rear ends with the elongated loops or eyes, to permit the forward movement of the bar P to withdraw the bolt V.

Having thus described my invention, I claim as new and desire to secure by Letters Patent—

1. In a vehicle, the combination, with the rear pivoted axle, B, of the centrally-pivoted lever P, with its pivot Q, adapted to have movement in the slot Q', the rods T, connecting the latter to the axle, the notched guide-frame U, and the spring-bolt V, substantially as and for the purpose specified.

2. In a vehicle, the combination, with the frame or platform A, of the front driving-wheel, devices for operating the same, the rear axle, B, pivoted on the frame, the lever P, the rods R T, the pivoted foot-rests S, the pintle Q, passing through the slot Q' in the frame, the bolt V, secured to the lever P, the spring W, and the guide-frame U, provided with a notch, a, and adapted to receive the end of the bolt V, substantially as herein shown and described, and for the purpose set forth.

ZACHARIAH HENDRICKSON.

Witnesses:
 JOHN S. WEAVER,
 WM. WALLIS.